(12) United States Patent
Gettemy et al.

(10) Patent No.: US 7,688,315 B1
(45) Date of Patent: Mar. 30, 2010

(54) PROXIMITY INPUT DETECTION SYSTEM FOR AN ELECTRONIC DEVICE

(75) Inventors: Shawn R. Gettemy, San Jose, CA (US); Yoon Kean Wong, Redwood City, CA (US)

(73) Assignee: Palm, Inc., Sunnyvale, CA (US)

( * ) Notice: Subject to any disclaimer, the term of this patent is extended or adjusted under 35 U.S.C. 154(b) by 811 days.

(21) Appl. No.: 09/991,344

(22) Filed: Nov. 20, 2001

Related U.S. Application Data (63) Continuation-in-part of application No. 09/728,023, filed on Nov. 30, 2000.

(51) Int. Cl.
G09G 5/00 (2006.01)

(52) U.S. Cl. .................. 345/174; 345/173; 345/901; 178/18.06; 178/18.07; 361/681

(58) Field of Classification Search ... 345/18.01–18.11, 345/19.01–19.07, 156–183, 901, 87–104, 345/211–213, 690–692, 961; 361/681, 683, 361/686; 455/556.1, 556.2, 566; 178/18.01, 178/18.03, 18.05, 18.06, 18.07, 19.03, 18.09; 349/61–64

See application file for complete search history.

(56) References Cited

U.S. PATENT DOCUMENTS

| | | | | |
|---|---|---|---|---|
| 4,429,478 | A |   | 2/1984 | Bruce-Sanders |
| 4,931,061 | A | * | 6/1990 | Young .......................... 47/57.6 |
| 4,988,837 | A | * | 1/1991 | Murakami et al. ....... 178/18.07 |
| 5,218,173 | A | * | 6/1993 | Garwin et al. ........... 178/18.08 |
| 5,357,061 | A | * | 10/1994 | Crutchfield .............. 178/18.08 |
| 5,381,160 | A | * | 1/1995 | Landmeier ................... 345/174 |
| 5,396,443 | A | * | 3/1995 | Mese et al. .................. 713/321 |
| 5,486,847 | A | * | 1/1996 | Ranf et al. ................... 345/173 |
| 5,579,037 | A | * | 11/1996 | Tahara et al. ................ 345/173 |
| 5,696,982 | A |   | 12/1997 | Tanigawa et al. |
| 5,889,236 | A | * | 3/1999 | Gillespie et al. ......... 178/18.01 |
| 5,949,643 | A |   | 9/1999 | Batio |
| 6,017,584 | A |   | 1/2000 | Albert et al. |
| 6,057,814 | A |   | 5/2000 | Kalt |
| 6,069,593 | A |   | 5/2000 | Lebby et al. |
| 6,118,426 | A |   | 9/2000 | Albert et al. |
| 6,144,358 | A |   | 11/2000 | Narayanaswamy et al. |
| 6,229,502 | B1 |   | 5/2001 | Schwab |
| 6,252,564 | B1 |   | 6/2001 | Albert et al. |
| 6,297,945 | B1 |   | 10/2001 | Yamamoto |
| 6,304,763 | B1 |   | 10/2001 | Jahagirdar et al. |
| 6,326,613 | B1 |   | 12/2001 | Heslin et al. |
| 6,327,482 | B1 |   | 12/2001 | Miyashita |
| 6,340,957 | B1 |   | 1/2002 | Adler et al. |

(Continued)

FOREIGN PATENT DOCUMENTS

EP 0898223 A2 2/1999

(Continued)

*Primary Examiner*—Richard Hjerpe
*Assistant Examiner*—Gregory J Tryder (57) ABSTRACT

A proximity input detection system for an electronic device. In one embodiment, the present invention utilizes an inductive field sensor to detect a change in a magnetic field when an input device with a coil is within a threshold distance. In another embodiment, the present invention utilizes a capacitive sensor which can locate the position of an electrically conductive object which is within a threshold distance. The capacitive sensor can also be used, for example, as a switch to activate the device if a user picks it up. The present invention allows user inputs to be detected without actually touching the electronic device. The present invention can also be used to detect inputs through intervening non-metallic layers such as a protective cover or another display of the device without using additional input sensors.

23 Claims, 8 Drawing Sheets

U.S. PATENT DOCUMENTS

| | | |
|---|---|---|
| 6,343,006 B1 | 1/2002 | Moscovitch et al. |
| 6,367,934 B1 | 4/2002 | Salesky et al. |
| 6,392,786 B1 | 5/2002 | Albert |
| 6,445,574 B1 * | 9/2002 | Saw et al. .................... 361/681 |
| 6,466,202 B1 * | 10/2002 | Suso et al. .................. 345/169 |
| 6,466,292 B1 * | 10/2002 | Kim .......................... 349/143 |
| 6,532,447 B1 * | 3/2003 | Christensson ............... 704/275 |
| 6,697,083 B1 * | 2/2004 | Yoon .......................... 345/658 |
| 6,788,292 B1 * | 9/2004 | Nako et al. ................. 345/173 |
| 6,924,791 B1 * | 8/2005 | Nicolas et al. .............. 345/179 |
| 2002/0021258 A1 | 2/2002 | Koenig |
| 2002/0021622 A1 | 2/2002 | Baroche |
| 2003/0114200 A1 | 6/2003 | Lee |
| 2003/0157969 A1 | 8/2003 | Kim |
| 2004/0165060 A1 | 8/2004 | McNelley et al. |

FOREIGN PATENT DOCUMENTS

| | | |
|---|---|---|
| EP | 1119158 | 7/2001 |
| EP | 1124175 | 8/2001 |
| EP | 1549028 | 6/2005 |
| JP | 8084286 | 3/1996 |
| WO | WO 87/06077 * | 10/1987 |
| WO | WO 00/59179 | 10/2000 |
| WO | WO 00/79372 A1 | 12/2000 |
| WO | WO 01/53919 | 7/2001 |

* cited by examiner

PROXIMITY INPUT DETECTION SYSTEM FOR AN ELECTRONIC DEVICE

RELATED APPLICATIONS

The following application is a continuation-in-part of co-pending patent application Ser. No. 09/728,023, filed Nov. 30, 2000 entitled Multi-Sided Display For Portable Computer, which is hereby incorporated by reference in its entirety herein.

BACKGROUND OF THE INVENTION

1. Field of the Invention

The present invention relates to the field of portable electronic devices that contain display devices. More particularly, the present invention provides an input sensing system which can detect an input in proximity to but not in contact with the surface of the display of an electronic device.

2. Prior Art

Advances in computer technology have enabled the further miniaturization of the components required to build computer systems. As such, new categories of computer systems have been created. One of the newer categories of computer systems is the portable, hand held, or "palmtop" computer system, also referred to as a personal digital assistant or PDA. Other examples of a portable computer system include electronic address books, electronic day planners, electronic schedulers and the like.

A palmtop computer system is a computer that is small enough to be held in the user's hand and as such is "palm-sized." As a result, palmtops are readily carried about in the user's briefcase, purse, and in some instances, in the user's pocket. By virtue of its size, the palmtop computer, being inherently lightweight, is therefore exceptionally portable and convenient.

Flat panel resistive touch screen displays are found in numerous electronic products such as wrist watches, hand calculators, cell phones and PDAs both to present information to the user as well as to facilitate input of data such as user touch screen commands. Such displays include a resistive digitizer mechanism and a display mechanism. A typical resistive digitizer mechanism consists of a digitizing element having a flexible thin film supported slightly above the surface of another thin layer digitizing element. A pressure applied to the outer surface of the flexible film causes the film to deflect and contact the digitizing element at a point which can be measured and thereby used as an input signal to activate the digitizer mechanism.

The flexible film and the digitizing element must be mounted in a support housing to provide and maintain the proper spacing between the two. At the same time, additional protection against moisture, dust, and mechanical damage must be provided for the flexible film used in the digitizer mechanism. Thus, an additional outer protective film mounted above the digitizer flexible film is generally included in the touch screen display assembly. One problem with this technology is a gradual reduction in the sensitivity to the external mechanical pressure required to activate the digitizer mechanism. In addition, the added protective film may increase overall opacity which makes it more difficult to view any display element housed within.

Figure 1:
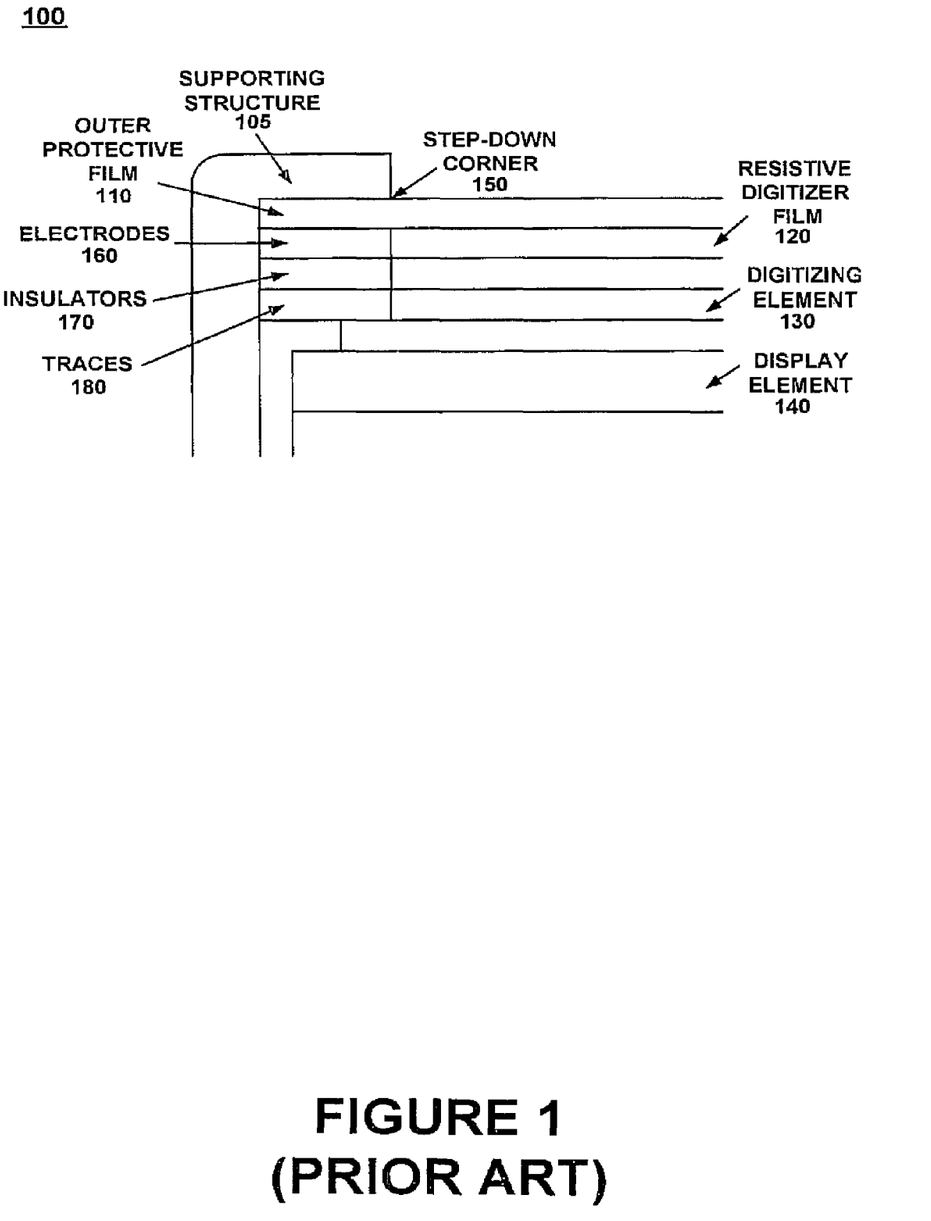
FIG. 1 is a cross sectional view of a display assembly utilized in prior art portable electronic devices.

FIG. 1 is a cross-sectional view of an enclosure/touch screen assembly 100 utilized in prior art. The entire assembly is held in place by the supporting structure 105. The outer protective film 110 provides mechanical protection for the resistive digitizer film 120. In addition, the outer protective film is coupled to the support mechanism in order to provide a moisture and dust seal. The digitizing element 130 is located below and close to the digitizer film 120. An externally applied pressure that deflects the protective film will also deflect the digitizer film.

Any applied pressure great enough to cause the digitizer film to contact the digitizing element will then activate the resistive digitizer mechanism. The display element 140 is located below the digitizer mechanism. User information is displayed on the upper surface of the display element. An icon sheet (not shown) is frequently disposed above display element 140 which delineates areas on the display screen for specific functions (e.g., button functions or a handwriting recognition area). Together, the protective film, the digitizer film and the digitizing element should have an opacity small enough to allow viewing of the information displayed on the display element.

The entire touch screen assembly is located within the support structure such that the surface of the outer protective film is below the upper edge of the support structure. There is therefore a step-down corner 150 from the upper edge of the support structure to the surface of the outer protective film and the resulting assembly exhibits a bezel like appearance. The support structure is also used to conceal the electrodes 160, insulators 170, and traces 180 which locate where the digitizer film and the digitizing element come into contact with each other.

One problem with the bezel design is that maintaining a moisture and dust-free environment for the touch screen mechanism is difficult. Such an assembly often does not provide a satisfactory moisture and dust proof enclosure. The bezel design adds to the complexity, cost of assembly, and overall thickness of the device. Additionally, some designers would like to eliminate the bezel to update the appearance of the device.

Another disadvantage with prior art display interfaces is the requirement that the digitizer assembly be a flat, two-dimensional surface. Currently, Indium Tin Oxide (ITO) is used as the conductive material (e.g., digitizer film 120 and digitizing element 130 of FIG. 1) in digitizer mechanisms. The digitizer mechanisms are formed by sputtering ITO onto a flat surface. The flat surface is required because while ITO has some flexibility, it is very brittle and will break down over time. Because of this ITO degradation, the interface of hand held computers needs to be re-calibrated occasionally. The brittleness factor necessitates an ITO layer that is flat and of uniform thickness. Additionally, the junction where the flexible digitizer film joins the electrodes and traces is frequently prone to failure.

The brittleness of the ITO limits the design of prior art devices to a flat interface which may not be suitable for some designs and makes a three-dimensional display surface impractical. A three-dimensional display would allow designers to contour the top surface such that it is not flat giving the device, for example, a curved top profile. The brittleness of the ITO also prevents using a printed decorative border sheet to conceal the electrodes and traces of the digitizer mechanism and eliminate the need for a bezel design.

Another drawback is that, because of the amount of space between the touch surface of the touch screen and display screen, there is a parallax effect. Simply stated, the parallax effect is a type of visual spatial distortion such that the actual point of contact on the touch screen does not correspond to the intended target area of the display screen. This is analogous to a stick being immersed in water, such that the stick takes on a bent or distorted appearance.

Also, the amount of light that comes from the display screen through the touch screen to be viewed by the user is only about 80% of the available light. In a reflective display, that amount is further reduced to about 64%. This reduces the overall contrast, clarity, and quality of the display as seen by the user.

Furthermore, the support structure and outer protective film are typically made of plastic. When subjected to normal use, the support structure and outer protective film can take on a scratched appearance which most users find unappealing. A protective cover may be used to protect the outside of the device, but this is inconvenient in that the device must be removed from the cover to use it and still does not protect the outer protective film while the device is being used.

SUMMARY OF THE INVENTION

Thus, a need exists for a touch screen sensor which overcomes the disadvantages of a resistive touch screen sensor in a portable electronic device and which provides input functionality such that the visual quality of the display is not diminished. An additional need exists for a user interface that fills the above need and which substantially reduces the parallax effect, such that the intended target within the display device is the actual point registered by the sensing system. Additionally, a need exists for an input sensing system which is not prone to degradation over time and facilitates greater protection from dust and moisture for the electronic device. An additional need exists for a user interface which allows greater flexibility in designing the appearance of the device. Finally, a need exists for a user interface which permits normal use of the device while providing greater protection from damage.

Accordingly, the present invention provides a user interface which overcomes the disadvantages of a resistive touch screen sensor in a portable electronic device and which provides input functionality such that the visual quality of the display is not diminished. The present invention further provides an interface which fills the above need and which substantially reduces the parallax effect, such that the intended target within the display device is the actual point registered by the sensing system. Additionally, the present invention is not prone to degradation over time and facilitates greater protection from dust and moisture for the electronic device. Embodiments of the present invention allow greater flexibility in designing the appearance of the device. Finally, the present invention permits using the electronic device while protecting the device from damage under normal use.

In one embodiment, the present invention utilizes an inductive field sensor as the touch screen component to detect a change in a magnetic field when an input device with a coil is within a threshold distance. In another embodiment, the present invention utilizes a capacitive sensor which can locate the position of an electrically conductive object which is within a threshold distance. The capacitive sensor can also be used, for example, as a switch to activate the device if a user picks it up. The present invention allows user inputs to be detected without actually touching the electronic device. The present invention can also be used to detect inputs through intervening non-metallic layers such as a protective cover or another display of the device without using additional input sensors.

These and other advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENT

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications and equivalents, which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
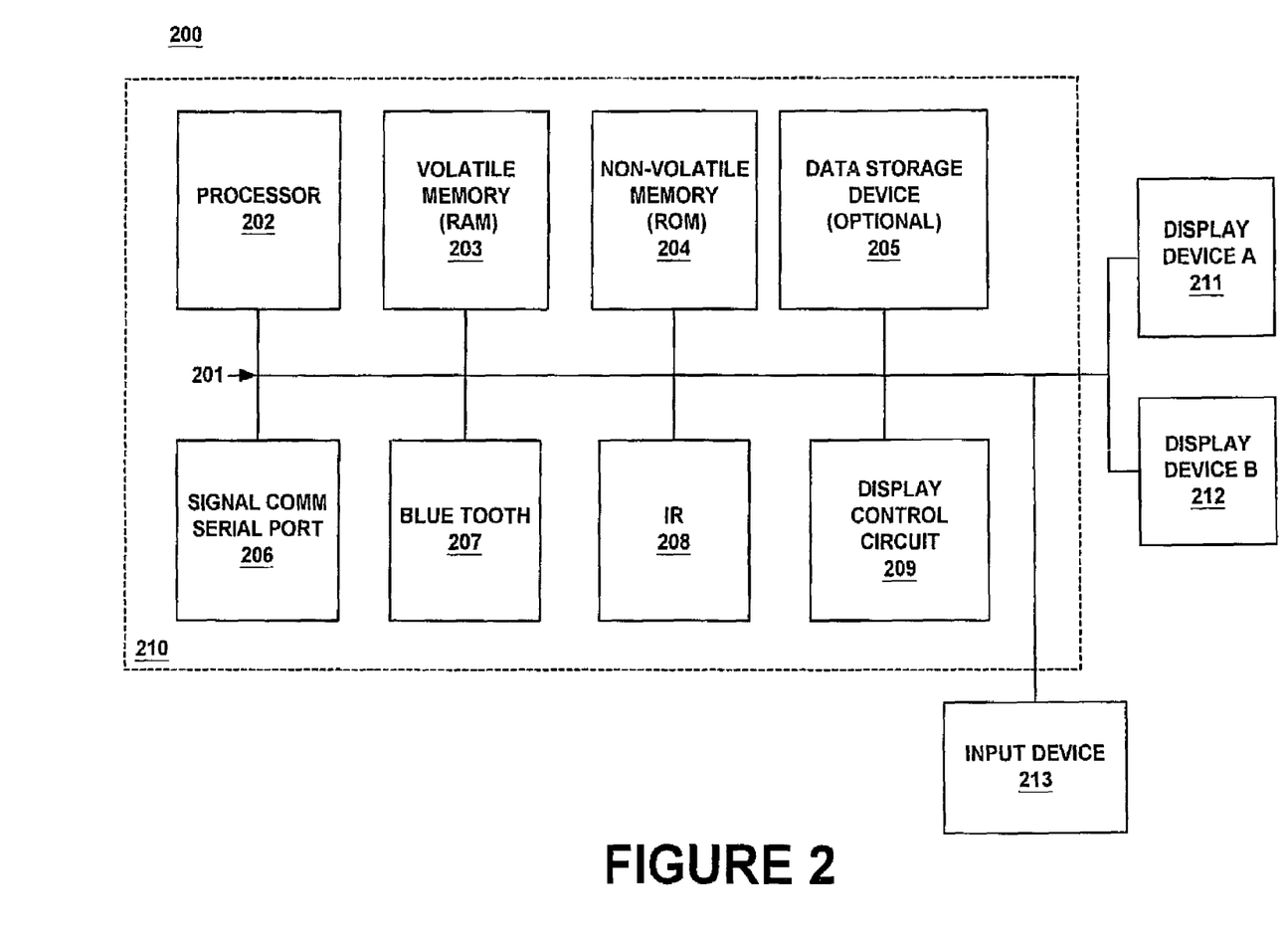
FIG. 2 illustrates an exemplary portable computer system upon which embodiments of the present invention may be utilized.

FIG. 2 illustrates exemplary circuitry of portable computer system 200. Portable computer system 200 includes an address/data bus 201 for communicating information, a central processor 202 coupled with the bus 201 for processing information and instructions, a volatile memory 203 (e.g., random access memory RAM) coupled with the bus 201 for storing information and instructions for the central processor 202 and a non-volatile memory 204 (e.g., read only memory ROM) coupled with the bus 201 for storing static information and instructions for the processor 202. Portable computer system 200 also includes an optional data storage device 205 (e.g., thin profile removable memory) coupled with the bus 201 for storing information and instructions. Device 205 can be removable.

As described above, portable computer system 200 also contains a signal communication device 206, also coupled to bus 201. Signal communication device 206 can be a serial port (or USB port) for communicating with a cradle (not shown). In addition to device 206, wireless communication links can be established between the portable computer system 200 and a host computer system (or another portable computer system) using a Bluetooth wireless device 207 or an infrared device 208. Display control circuit 209 is for activating display devices coupled with system 200. These components are housed on a circuit board 210 which is contained within a cover assembly.

Also included in portable computer system 200 of FIG. 2 is a display device A (211) and a display device B (212). Display device 211 may be an active matrix LCD, a passive matrix LCD, electronic paper (E-paper), field emission display (FED), organic LED (OLED) or a variety of other display technologies. Display device 212 may be an active matrix LCD, a passive matrix LCD, or another display technology which is sufficiently transparent that another display device (e.g., display device 211) can be viewed through display device 212. In one embodiment, the displays 211-212 are multi-mode displays capable of both monochrome and color display modes. Display devices 211-212 are activated by display control circuit 209 according to the position of a front cover for system 200 (not shown).

Portable computer system 200 also includes an input device 213 coupled with bus 201. In an embodiment of the present invention, the input device 213 may be an inductive sensor which is able to detect changes to a magnetic field from an object in proximity to but not in contact with the surface of the sensor. Input device 213 can communicate information (spatial data) and command selections to the central processor 102. Input device 213 is capable of registering a position on display devices 211-212 of a user response to information displayed on the display devices.

Figure 3:
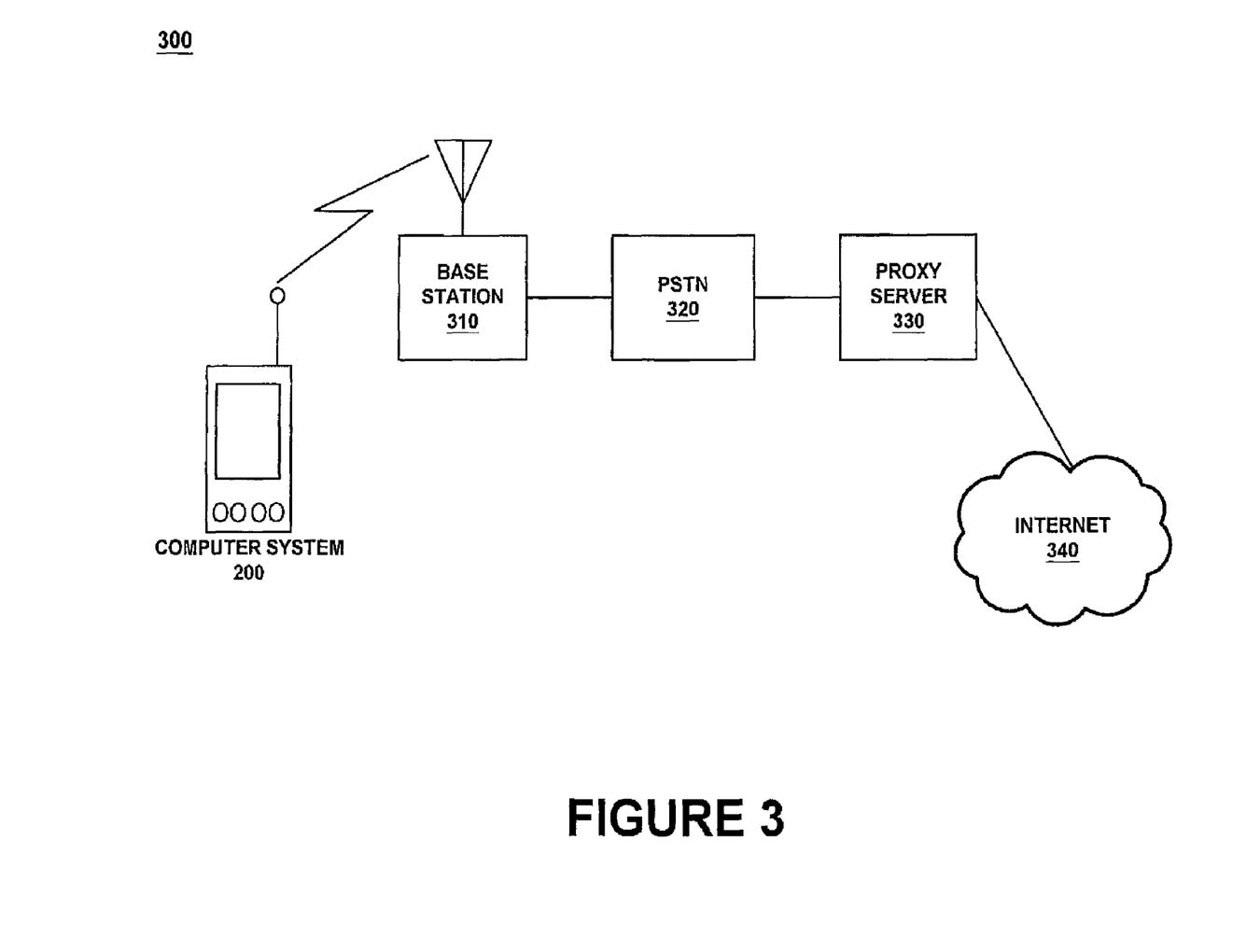
FIG. 3 is a diagram of an exemplary computer network including a portable computer system utilized in accordance with embodiments of the present invention.

FIG. 3 is a block diagram of an exemplary network environment 300 including a portable computer system (e.g., portable computer system 200) upon which embodiments of the present invention may be practiced, in accordance with one embodiment of the present invention. Portable computer system 200 is also known as a palmtop or palm-sized computer system. In one embodiment, portable computer system 200 has the ability to transmit and receive data and information over a wireless communication interface (e.g., a radio interface). For purposes of the present application, the term "portable computer system" is not intended to be limited solely to conventional palmtop or portable computers. Instead, the term "portable computer" or "portable computer system" is also intended to include any mobile electronic device. Such mobile devices include but are not limited to pagers and paging systems, wireless and cellular telephones, electronic address books, and numerous other mobile devices that may have the ability to conduct wireless communications with a network. As such, for purposes of the present application, the terms "portable computer" and "mobile device" will be considered synonymous and will be used interchangeably.

Base station 310 can be both a transmitter and receiver base station, which can be implemented by coupling it into an existing public switched telephone network 320. Implemented in this manner, base station 310 enables portable computer system 200 to communicate with a proxy server computer system 330, which is coupled by wire to the existing public switched telephone network 320. Furthermore, proxy server computer system 330 is coupled to the Internet 340, thereby enabling portable computer system 200 to communicate with the Internet 340. When communicating with a Web site over Internet 340, protocols such as CTP (Compact Transport Protocol) and CML (Compact Markup Language) and WML (Wireless Markup Language) can be used by portable computer system 200 in the present embodiment.

It should be appreciated that one of the functions of proxy server 330 is to perform operations over the Internet 340 on behalf of portable computer system 200. For example, proxy server 330 has a particular Internet address and acts as a proxy device for portable computer system 200 over the Internet 340. It should be further appreciated that other embodiments of a communications network, planned or envisioned, may be utilized in accordance with the present invention. For example, a wireless connection may be made from portable computer system 200 directly to the Internet 340.

The data and information which are communicated between base station 310 and portable computer system 200 are the same type of information and data that can conventionally be transferred and received over a public switched telephone network. Additionally, in FIG. 3, the existing public switched telephone network could also be a packet-based network utilized by some conventional portable computer systems. However, a wireless communication interface is utilized to communicate data and information between portable computer system 200 and base station 310. Furthermore, nearly any wireless network can support the functionality to be disclosed herein.

Figure 4:
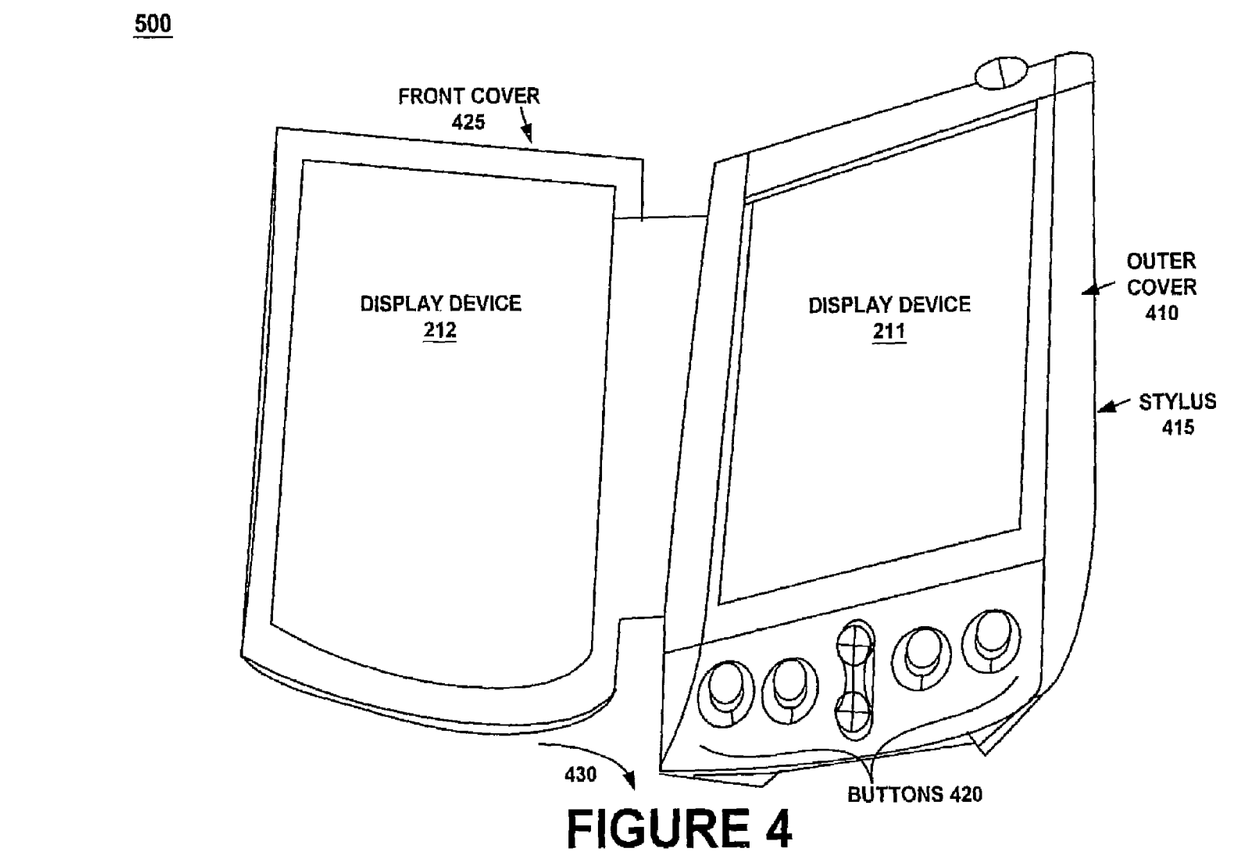
FIG. 4 shows a front perspective of a portable computer system configured with a front cover utilized in accordance with embodiments of the present invention.

FIG. 4 is a front perspective view of an exemplary portable computer system 400 upon which embodiments of the present invention may be utilized. While the present embodiment recites a portable computer system, the present invention is not intended to be limited solely to conventional palmtop or portable computers. Instead, the term "portable computer" or "portable computer system" is also intended to include any mobile electronic device. Such mobile devices include but are not limited to pagers and paging systems, wireless and cellular telephones, electronic address books, and numerous other mobile devices that may have the ability to conduct wireless communications within a network.

In FIG. 4, portable computer system 200 contains a display screen (e.g. display device 211 of FIG. 2) surrounded by a outer cover 410. A removable stylus 415 is disposed along the right side of portable computer system 200, but by virtue of the angle of the illustration, is not shown. In one embodiment, stylus 415 has a metal tip that can be detected by a capacitive sensor located below display device 211 and registered as an input to computer system 200. In another embodiment, stylus 415 contains electrical elements which interfere with an inductive field generated by an inductive array disposed beneath display device 211, located by the sensor, and registered as an input to portable computer system 200. Outer cover 410 also contains one or more dedicated and/or programmable buttons 420 for selecting information and causing portable computer system 200 to implement functions.

FIG. 4 also shows a removable front cover 425 that is coupled to portable computer system 200 by a hinge. Front cover 425 provides protection to portable computer system 200 and, in embodiments of the present invention, is configured with a two-sided display panel (e.g., display device 212 of FIG. 2). Display device 212 is configured in front cover 425 such that there is a front display (display area 520 of FIG. 5A) which is visible when front cover 425 is closed and a back display (display area 530 of FIG. 5B) which is visible when front cover 425 is opened. Front cover 425 may rotate as shown by arrow 430 about the axis of the hinge.

Figure 5A:
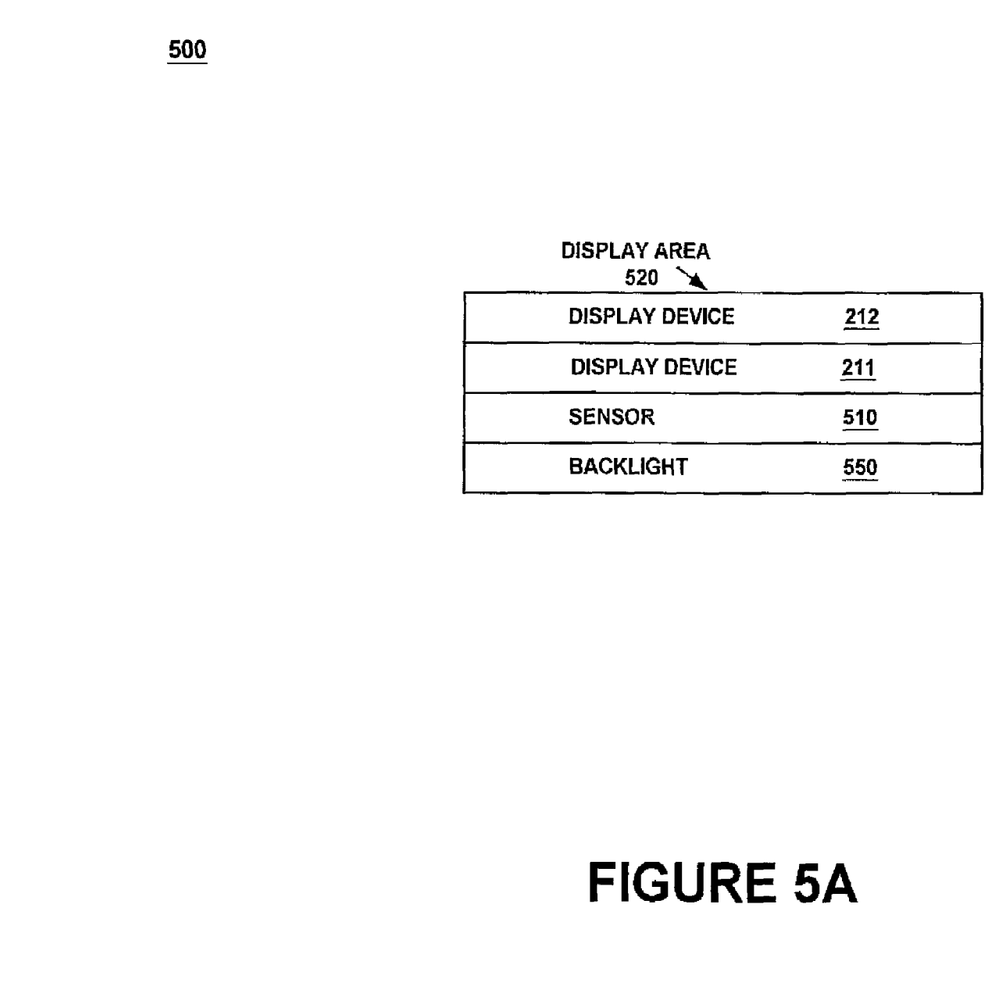
FIGS. 5A-5B are cross sectional views of a portable electronic device having a front cover configured with a input detection system in accordance with embodiments of the present invention.
Figure 5B:
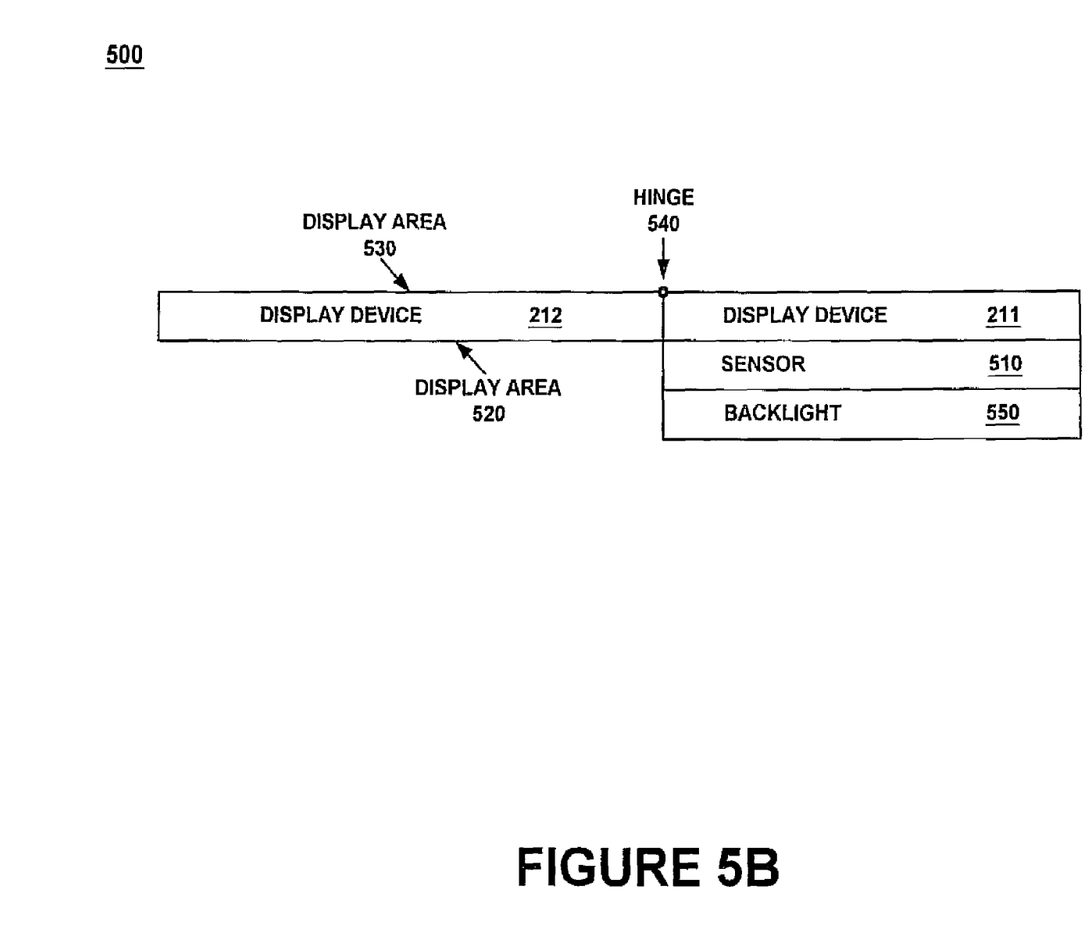

FIGS. 5A-5B are cross section views of an exemplary portable computer system upon which embodiments of the present invention may be utilized. FIGS. 5A-5B show the general disposition of the display and sensor apparatuses when front cover 425 is in an opened and closed position. In FIG. 5A, front cover 425 is closed and display device 212 is disposed above display device 211. An optional backlight 550 is disposed beneath sensor 510 which is disposed beneath display device 211.

Display device 211 may be an active matrix LCD, a passive matrix LCD, electronic paper (E-paper), field emission display (FED), organic LED (OLED) or a variety of other display technologies. Display device 212 may be an active matrix LCD, a passive matrix LCD, or another display technology which is sufficiently transparent that display device 211 can be viewed through display device 212. In other words, due to the transparency of display device 212, display device 211 is also visible when front cover 425 is in a closed position and characters displayed on display device 211 are visible. A control circuit (e.g., display control circuit 209 of FIG. 2) detects when front cover 425 is in a closed position and activates the appropriate display portions (e.g., display area 520 and display device 211). This allows showing multiple screens of information while front cover 425 is in a closed position, thus increasing the viewable area available to a user.

In one embodiment, sensor 510 is an inductive sensor which is able to detect an object at a distance from the sensor itself and through intervening layers such as the Spiral® inductive sensor which is commercially available from Synaptics Inc. of San Jose, Calif. In one embodiment, stylus 415 contains, for example, an inductor and a capacitor which will interfere with an inductive field emanating from sensor 510 and is registered as an input to portable computer system 200. A user can indicate an input to portable computer system 200 without actually touching the display surface with stylus 415. Furthermore, because sensor 510 can detect through intervening layers, it can be used for determining user inputs to display device 212 when front cover 425 is closed, thus increasing the viewable area of portable computer system 200. When used in conjunction with the transparent display described above, one sensor can be used to detect inputs to both display device 211 and 212. Because the present invention only requires one sensor, portable computer system 200 can be manufactured at a lower cost than prior art systems that require multiple input sensors to achieve the same level of functionality.

Another advantage of the present invention is that inductive sensors are more flexible and thinner than resistive digitizer mechanisms. This gives designers more options in designing the appearance of their products such as a thinner device which has a curved top surface. The present invention also provides greater durability due to the fact that the sensor itself is not being physically contacted by a user and because the brittleness and degradation of the ITO is no longer a factor. The present invention allows a manufacturer to eliminate the bezel appearance of the front cover and to create a better seal against dust and moisture. Because sensor 510 can be disposed behind display devices 211-212, parallax will be reduced as there are fewer intervening layers between the display and the user and greater transparency of the display is achieved.

In one embodiment, when front cover 425 is opened, the detection threshold of sensor 510 is altered so that a gesture above display area 530 can be detected as well as a gesture above display device 211. In another embodiment, an additional sensor (e.g., sensor 610 of FIG. 6) is disposed in front cover 425 and is activated when front cover 425 is opened. Sensor 610 can be, for example, electrically coupled with portable computer system 200 through hinge 540.

Furthermore sensor 510 has sufficient sensitivity to differentiate the proximity of stylus 415 and, in response to that proximity, causes display control circuit 209 to change the active display. For example, if front cover 425 is in a closed position a user can interact with either display device 212 or display device 211 by changing the height of stylus 415 above the display. When stylus 415 is moved closer to the surface of portable computer system 200 display control circuit 209 changes the active display from device 212 to 211. The active display can, for example, become grayed out when it becomes inactive or can change from a color display to black and white.

In another embodiment, sensor 510 is a capacitive sensor such as the MultiTouch sensor which is commercially available from FingerWorks Incorporated of Newark, Del. The MultiTouch sensor is capable of remotely detecting, (e.g., in proximity to but not touching the sensor itself), the presence of an electrically conductive material (e.g. metal or a user's finger). Previous capacitive sensors were able to detect electrical conductors only when they were touching a protective cover above the capacitor. However, advances in the technology have created sensors with much greater sensitivity which are able to detect the electrical conductors at a distance up to an inch from the sensor and through an intervening non-metallic material. A user can make an indication above the surface of the display which can be registered by sensor 510 as an input to portable computer system 200.

The remote sensing capability of a capacitive sensor allows users to input information into portable computer system 200 using, for example, only their finger and allows the manufacturer to incorporate functions into the border areas outside of the display areas such as outer cover 425 of FIG. 4. For example, users could scroll down a text display by simply running their finger down outer cover 425 without obstructing their view of the display.

Additionally, the direction in which a capacitive sensor detects can be reversed so that electrically conductive materials are detected through the back cover of portable computer system 200. In one embodiment, when a user picks up portable computer system 200, sensor 510 detects the capacitance of the user's hand and actuates or powers up portable computer system 200. This eliminates the need for an on/off switch and can be incorporated with a power saving system to turn off portable computer system 200 when it is not being handled by a user, thus extending the battery life of the system.

Furthermore sensor 510 has sufficient sensitivity to differentiate the proximity of a user's finger and, in response to that proximity, causes display control circuit 209 to change the active display. For example, if front cover 425 is in a closed position a user can interact with either display device 212 or display device 211 by changing the height of their finger above the display. When their finger is moved closer to the surface of portable computer system 200 display control circuit 209 changes the active display from device 212 to 211. The active display can, for example, become grayed out when it becomes inactive or can change from a color display to black and white.

FIG. 5B shows portable computer system 200 with front cover 425 in an open position. When front cover 425 is opened, display control circuit deactivates display area 520 and activates display area 530. Information previously displayed on display area 520 is now reoriented so as to be displayed on display area 530. No change is made to information on display device 211. The advantage of having the displays arrayed in this configuration is that a program requiring a larger viewing area such as a spreadsheet can be viewed by a user without having to scroll to the relevant portion.

Figure 6:
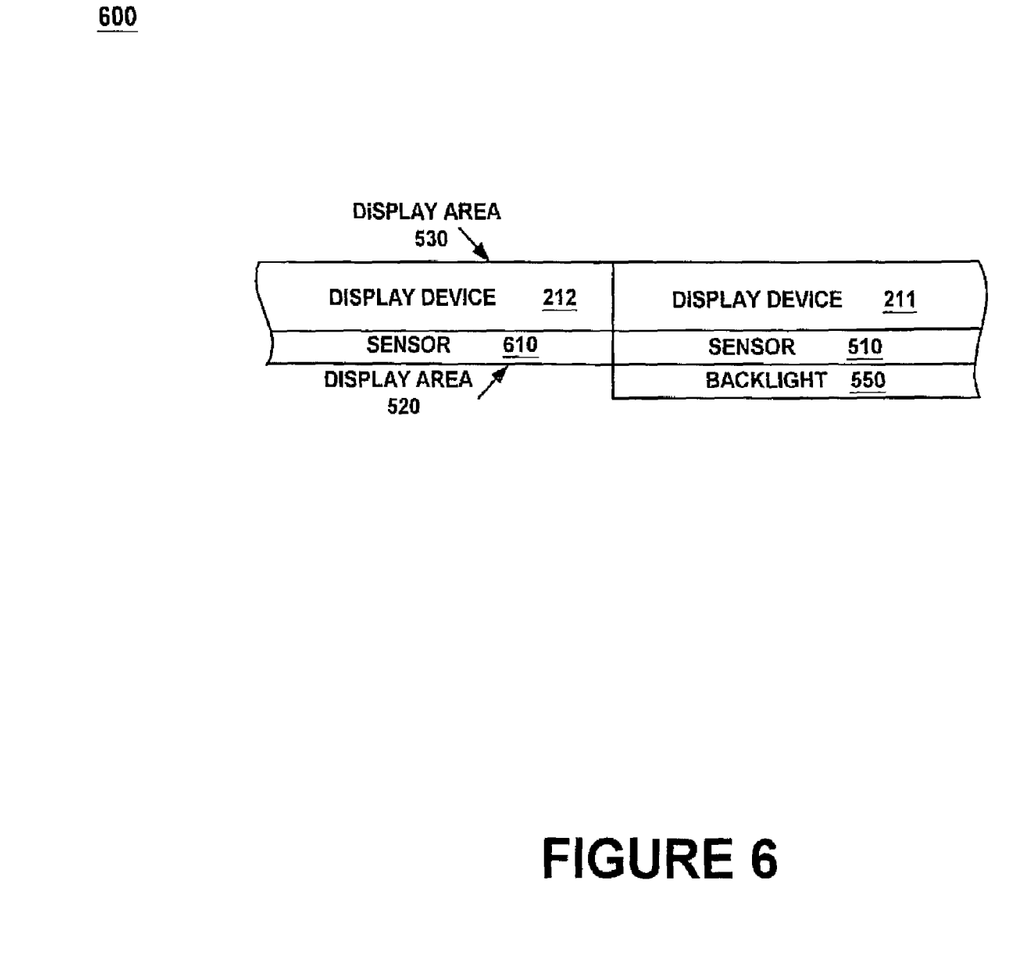
FIG. 6 is a cross sectional view of a display panel and an input detection system used in accordance with one embodiment of the present invention.

FIG. 6 shows a cross section view of a display panel and a input detection system used in accordance with one embodiment of the present invention. In FIG. 6, front cover 425 is in an open position and a second sensor 610 is shown disposed below display device 212. While FIG. 6 shows sensor 610 as being disposed below display device 212, the present invention is well suited to disposing sensor 610 above display device 212 or between display areas 520 and 530 of display device 212.

Figure 7:
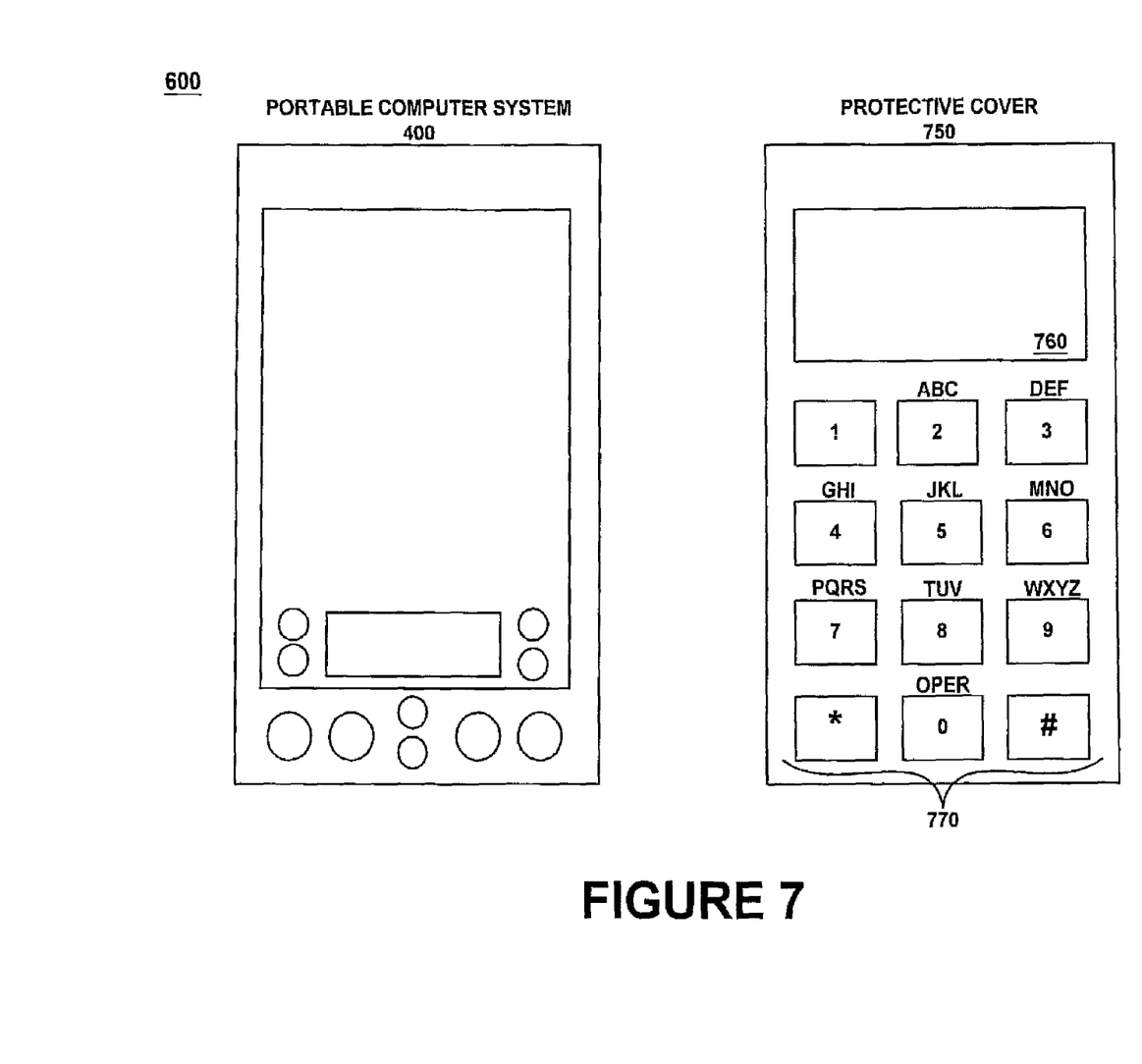
FIG. 7 shows an exemplary portable electronic device and cover used in accordance with embodiments of the present invention.

Embodiments of the present invention allow portable computer system 400 to be used when a protective cover (e.g., protective cover 750 of FIG. 7) is in place. Protective cover 750 can protect portable computer system 400 from damage by, for example, sliding portable computer system 400 into an opening of protective cover 750. Because sensor 510 can detect user inputs away from the surface of the sensor and through intervening layers, portable computer system 400 can still be used when protective cover 750 is in place. An opening 760 in the face of protective cover 750 allows a user to view a portion of the display screen when the cover is in place and can simply be an opening in protective cover 750 or have a plastic window to protect the face of display area 520. Protective cover 750 can be made of a variety of materials (e.g., leather or plastic) without interfering with the functioning of computer system 400 or could be made entirely of clear plastic which has the advantage of allowing the full functionality of portable computer system 400 while protecting it from damage. Protective cover 750 can have printed or embossed features 770 to indicate button areas to give portable computer system 400 specific functions such as a calculator or a phone dialer (as shown in FIG. 7). Protective cover 750 could have electronics which interact with sensor 510 to indicate which function is to be performed while the cover is in place.

The preferred embodiment of the present invention, a proximity input detection system for an electronic device, is thus described. While the present invention has been described in particular embodiments, it should be appreciated that the present invention should not be construed as limited by such embodiments, but rather construed according to the following claims.

What is claimed is:

1. An input detection system for an electronic device comprising:
   a first display component;
   a second display component disposed above said first display component; and
   a sensor component operable to detect inputs in proximity to a surface of said electronic device, wherein said sensor component is further operable to differentiate between respective heights of said inputs above said surface of said electronic device, and wherein said input component is further for detecting interaction with said first and second display components at said respective heights above said surface of said electronic device.

2. The electronic device as recited in claim 1, wherein said sensor component comprises a capacitive sensor.

3. The electronic device as recited in claim 1 further comprising:
   a control component; and
   wherein said sensor component is further operable to detect handling of said electronic device, and wherein said control component is operable to activate said electronic device in response to said detection of said handling.

4. The electronic device as recited in claim 1, wherein said sensor component comprises an inductive sensor.

5. The electronic device as recited in claim 1 further comprising:
   a control component for detecting when said cover is in a closed position and in an open position, and wherein said control component is further operable to alter a detection threshold of said sensor component when said cover is in said open position.

6. The device as recited in claim 5, wherein said sensor component, responsive to said altered detection threshold, detects an indication above said surface of said electronic device and said control component registers said indication as an input to said electronic device.

7. The electronic device as recited in claim 1 further comprising:
   a second sensor component operable to detect an indication in proximity to but not in contact with said surface of said electronic device, and wherein said indication is registered as an input to said electronic device.

8. The electronic device as recited in claim 1 further comprising:
   a housing;
   a cover coupled to said housing by a hinge; and
   wherein said second display component is disposed within said cover having sufficient transparency to permit viewing of said first display component when said cover is in a closed position and when said second display component is disposed above said first display component.

9. The electronic device as recited in claim 8, wherein said sensor component is operable to detect an input above said second display component when said cover is in a closed position above said first display component.

10. An electronic device comprising:
    a first display component;
    a second display component disposed above said first display component; and
    a capacitive sensor component operable to detect inputs in proximity to a surface of said electronic device, wherein said capacitive sensor component is further operable to differentiate between respective heights of said inputs above said surface of said electronic device, and wherein said capacitive input component is further for detecting interaction with said first and second display components at said respective heights above said surface of said electronic device.

11. The electronic device as recited in claim 10 further comprising:
    a control component for detecting when said cover is in a closed position and in an open position, and wherein said control component is further operable to alter a detection threshold of said capacitive sensor component when said cover is in said open position.

12. The electronic device as recited in claim 11, wherein said capacitive sensor component, responsive to said altered detection threshold, detects an indication above said surface of said electronic device and said control component registers said indication as an input to said electronic device.

13. The electronic device as recited in claim 10 further comprising:
    a second capacitive sensor component operable to detect an indication in proximity to but not in contact with said surface of said electronic device, and wherein said indication is registered as an input to said electronic device.

14. The electronic device as recited in claim 10 further comprising:
    a control component; and
    wherein said capacitive sensor component is further operable to detect handling of said electronic device, and wherein said control component is operable to activate said electronic device in response to said detection of said handling.

15. The electronic device as recited in claim 10 further comprising:
a housing;
a cover coupled to said housing by a hinge; and
wherein said second display component is disposed within said cover having sufficient transparency to permit viewing of said first display component when said cover is in a closed position and when said second display component is disposed above said first display component.

16. The electronic device as recited in claim 15, wherein said capacitive sensor component is operable to detect an input above said second display component when said cover is in a closed position above said first display component.

17. An electronic device comprising:
a first display component;
a second display component disposed above said first display component; and
an inductive sensor component operable to detect inputs in proximity to a surface of said electronic device, wherein said inductive input component is further operable to differentiate between respective heights of said inputs above said surface of said electronic device, and wherein said inductive input component is further for detecting interaction with said first and second display components at said respective heights above said surface of said electronic device.

18. The electronic device as recited in claim 17 further comprising:
a control component for detecting when said cover is in a closed position and in an open position, and wherein said control component is further operable to alter a detection threshold of said inductive sensor component when said cover is in said open position.

19. The electronic device as recited in claim 18, wherein said inductive sensor component, responsive to said altered detection threshold, detects an indication above said surface of said electronic device and said control component registers said indication as an input to said electronic device.

20. The electronic device as recited in claim 17 further comprising:
a second inductive sensor component operable to detect an indication in proximity to but not in contact with said surface of said electronic device, and wherein said indication is registered as an input to said electronic device.

21. The electronic device as recited in claim 17 further comprising:
a housing;
a cover coupled to said housing by a hinge; and
wherein said second display component is disposed within said cover having sufficient transparency to permit viewing of said first display component when said cover is in a closed position and when said second display component is disposed above said first display component.

22. The electronic device as recited in claim 21, wherein said inductive sensor component is operable to detect an input above said second display component when said cover is disposed above said first display component.

23. The electronic device as recited in claim 17 further comprising:
a control component; and
wherein said inductive sensor component is further operable to detect handling of said electronic device, and wherein said control component is operable to activate said electronic device in response to said detection of said handling.

* * * * *